June 1, 1965 R. J. RICCIARDI 3,186,602
FEEDING APPARATUS FOR PARTICULATE MATERIAL
Filed Sept. 5, 1963 2 Sheets-Sheet 1

INVENTOR.
RONALD J. RICCIARDI
BY
*Neal, Neal, Hamilton, Owen & McElhannon*
ATTORNEYS

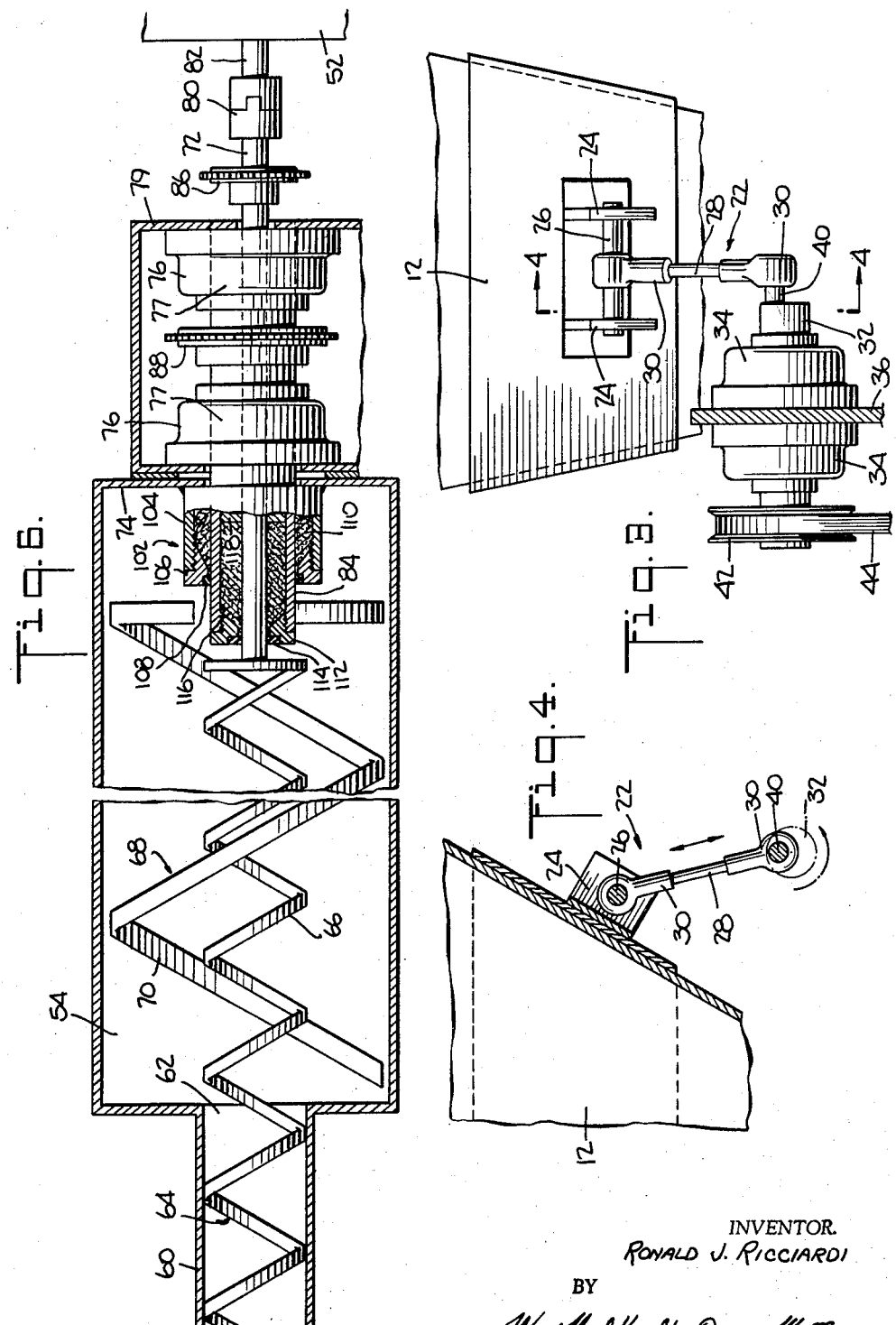

United States Patent Office 3,186,602
Patented June 1, 1965

3,186,602
FEEDING APPARATUS FOR PARTICULATE MATERIAL
Ronald Joseph Ricciardi, Garfield, N.J., assignor to Jos. L. Muscarelle, Hackensack, N.J.
Filed Sept. 5, 1963, Ser. No. 306,845
10 Claims. (Cl. 222—161)

This invention relates to feeding apparatus and more particularly to apparatus for conditioning and dispensing particulate solid material. Feeders embodying the present concept are particularly adapted, among other possible uses, for dispensing material where accurate volumetric metering is desired. Such material includes inter alia, flour, salt, grain, coffee, powdered cream, cocoa, and even material containing a percentage of moisture.

Heretofore, various means have been employed for agitating bins in order to assist the flow of material to the dispensing apparatus. Prior art apparatus commonly in use included high frequency vibrators mounted on the sides of the bins, or mechanical means for rocking the bin about a pivot line located towards the base of the bin. However, a number of difficulties were encountered with such prior art constructions, including densifying or compacting the material, segregating various components contained in the material, degrading the material or aerating the material.

It has been customary to utilize auger means for dispensing particulate solid material from bins or the like. However, such augers did not dispense the material with consistent volumetric accuracy. Moreover, the augers tended to densify or compact the material and dispense same under pressure.

According to the present invention, a new and improved apparatus for conditioning and dispensing particulate solid material comprises a bin supported for pivotal movement about an axis located upwardly from the base thereof. The bin is provided with an upper receiving inlet and a lower dispensing outlet and means are provided for rocking the bin about the axis. A conditioning chamber, in material flow communication with the bin outlet, is provided and includes outlet means, a first auger disposed within the chamber and extending toward the outlet means, a second larger auger mounted coaxially with respect to the first auger and in spaced relationship thereto, and means for rotating the augers at a preselected ratio of speeds.

A feature of my invention resides in the provision of an improved conditioning and feeding apparatus which accurately meters the material, which continuously dispenses material, which gently conditions the material whereby its characteristics are retained as closely as possible to the normal or natural state of that particular material, which is vibration-free, which is adjustable while operating, which is adaptable for use with a variety of materials, and which dispenses material in a non-segregated, non-degraded, non-aerated, non-compacted condition.

Another feature of the present invention resides in the provision of an improved apparatus which is dependable, which is non-detrimental to the material, which requires low power consumption, which provides a high percentage of uniformity of material being discharged, which dispenses the material independently of the material being stored thereabove, which improves the flow of material from the upper bin to the conditioning chamber, and which is compact, convenient, practical and inexpensive.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended thereo. Those skilled in the art will appreciate that the conception of which this disclosure is based may readily be utilized as a basis for the designing of other structures for carrying out the several purposes of the invention. It is important, therefore, that the claims be regarded as including such equivalent constructions as do not depart from the spirit and scope of the invention. A specific embodiment of the invention has been chosen for purposes of illustration and description, and is shown in the accompanying drawings, forming a part of the specification, wherein:

FIG. 4 is a sectional view taken along line 4—4 of FIG. 3;

FIG. 5 is an enlarged sectional view taken along line 5—5 of FIG. 1 and showing the interconnection of the bin and the conditioning chamber; and FIG. 6 is an enlarged sectional view showing the construction and operation of the conditioning chamber and augers.

Figure 1:
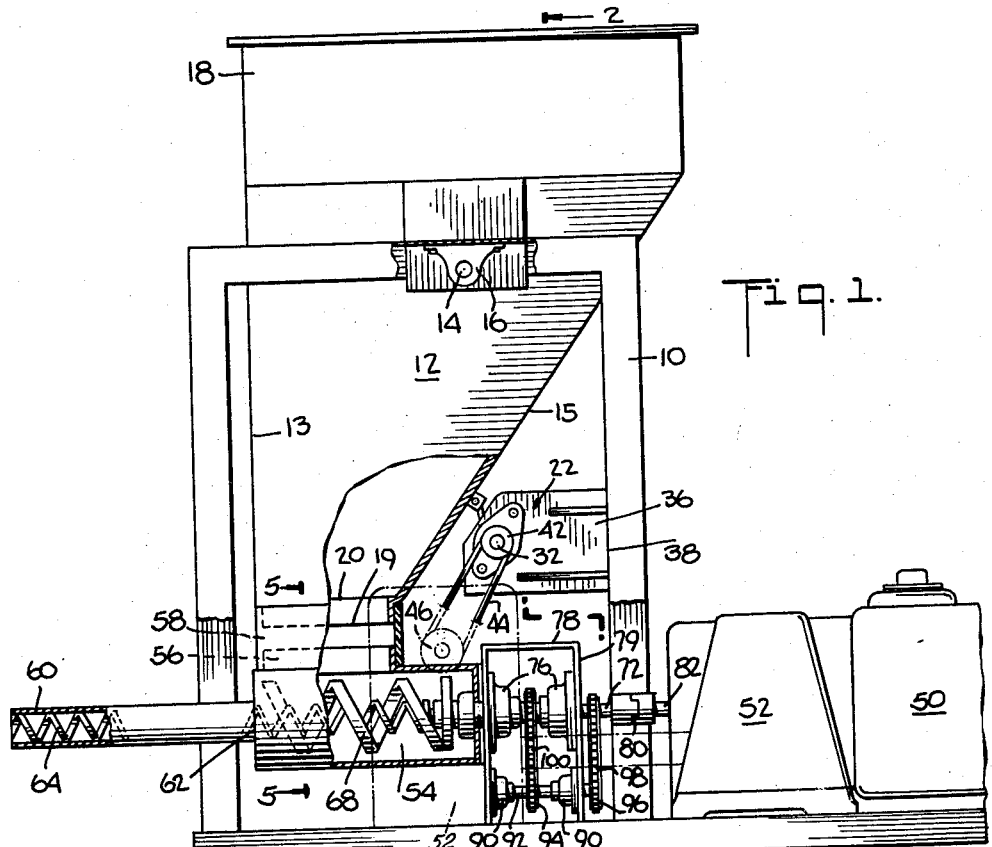
FIG. 1 is a side elevation, partially broken away, showing a feeder apparatus constructed in accordance with my invention.
Figures 2, 3:
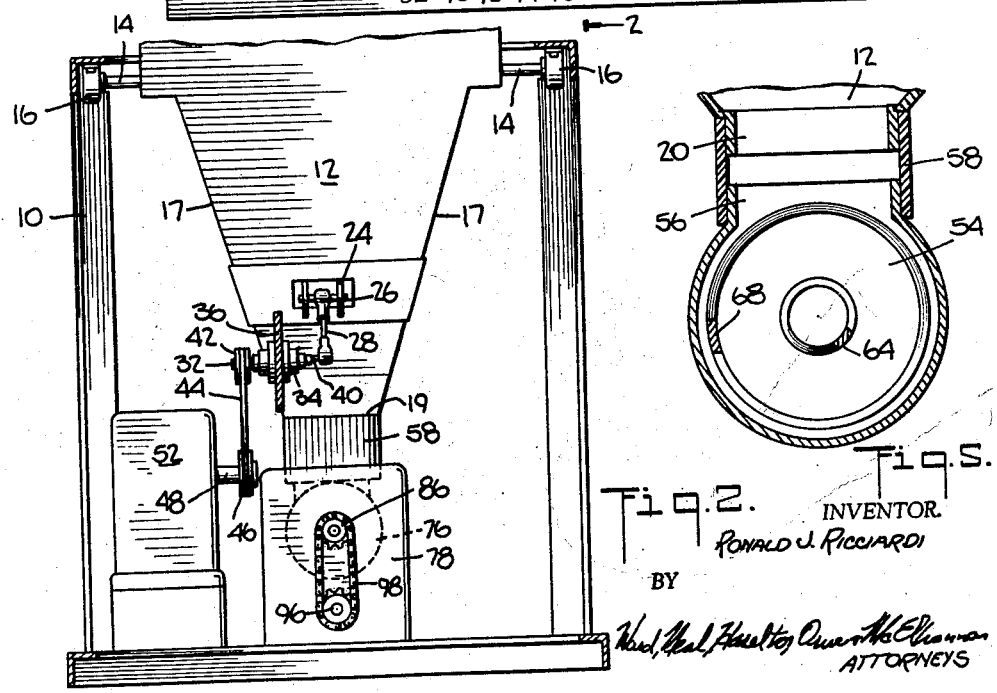
FIG. 2 is a vertical sectional view taken along line 2—2 of FIG. 1.
FIG. 3 is an enlarged detailed view showing the construction and operation of the bin rocking mechanism.

In the illustrated embodiment of the invention, the feeding apparatus includes a frame 10 which supports the bin 12 for pivotal movement by means of a pair of pins 14 mounted in bearings 16 (FIGS. 1 and 2). The bin 12 has a substantially vertically extending forward wall 13, an inclined rear wall 15 and a pair of oppositely disposed and inclined side walls 17. The pins 14 are mounted on the side walls 17 at a location upwardly from the base 19 of the bin at a distance of the order of about two-thirds of the height of the bin. Thus, the bin is adapted for rocking or pivotal motion about a horizontal line extending between the pins 14.

The bin 12 is provided with an upper receiving inlet 18 and a lower dispensing outlet 20 for receiving and dispensing particulate solid material. Linkage means designated generally at 22, shown in detail in FIGS. 3 and 4, are mounted on the rear wall 15 of the bin 12 for imparting reciprocating motion thereto. This linkage means includes a pair of spaced apart brackets 24 mounted on the rear wall 15 for carrying a pin 26. A drive shaft 32 is rotatably mounted on bearings 34 (FIG. 3) which are supported by a bearing support member 36 mounted on the frace 10 as at 38 (FIG. 1). Referring back to FIGS. 3 and 4, drive shaft 32 is provided with an eccentric shaft-like projection 40 at one end thereof for imparting reciprocating motion to the bin 12 through a connecting rod 28 having bearings 30 disposed at each end thereof, one bearing for the joint with the pin 26 and the other bearing for the joint with the eccentric projection 40. A pulley 42 is mounted on the other end of the drive shaft 32 for carrying a belt 44. As best seen in FIG. 2, belt 44 is also carried by a pulley 46 which is mounted on a drive shaft 48 which is driven by means of an electric motor 50 through a variable speed transmission 52. Preferably the variable speed transmission is adjusted, in known manner, to drive the shaft 48 at a roational speed of the order of about 350 to 650 r.p.m. Movement of the bin at the base thereof is of the order of about ⅜₁₆ of an inch total travel. Thus, it is seen that the bin 12 is reciprocally-pivotally rocked in a manner which is closely analogous to manually emptying or "shaking out" a product from a container. This vibration-free means for dispensing material insures a non-segregated, non-degraded, non-aerated and non-compacted continuous supply of material to a conditioning chamber 54 located below the bin 12. It is important to note that the action of the bin is such that only the material about to enter the conditioning chamber is receiving maximum hoppering movement. This maximum movement is the end result of a gradually increasing movement as the material progresses towards the lower dispensing outlet.

Material flow communication between the outlet 20 of the bin 12 and an inlet 56 of the conditioning chamber 54 is provided by means of a coupling 58 which is manufactured of a flexible material so that the motion of the bin 12 will not be imparted to the stationary chamber 54 (FIG. 5).

As best seen in FIG. 6, the conditioning chamber 54 conditions and meters the material prior to its final discharge through a discharge conduit 60 removable connected to the end of the conditioning chamber 54 adjacent a dispensing outlet 62. A first horizontally disposed auger 64 is centrally positioned within the conditioning chamber 54 and extends through the dispensing outlet 62, and through the discharge conduit 60. Preferably this auger operates with a relatively close clearance between its outer periphery and the walls of the discharge conduit 60, which clearance depends upon the particular material being processed, the normal radial clearance being of the order of about $\frac{1}{32}$ of an inch. The auger 64 is provided with a helical coil type blade 66 for metering and propelling a predetermined quantity of material toward and through the dispensing outlet 62 and through the discharge conduit 60 in response to rotation of the auger.

A second, larger auger 68 is mounted co-axially with respect to the first auger 64 and in radially spaced relation thereto. One end of the second auger 68 terminates at a location adjacent the dispensing outlet 62. Auger 68 is provided with a helical coil type blade 70 for conditioning and thence feeding the material towards the dispensing outlet 62 and inwardly into the first auger 64 at a substantially constant volumetric displacement of the material. It is noted that the second auger 68 is of larger volumetric capacity than the first auger 64.

The second auger 68 is mounted concentrically about the first auger 64, but it rotates at a different speed, the speed variation between the two augers being dependent upon the particular material being conditioned and dispensed. It is the ratio of the two different speeds that results in the high degree of accuracy and dependability of metering and dispensing said material. It will be appreciated that the ratio of speeds is preselected and is adjustable in order to control and meter the material being dispensed as desired. For example, it has been found from actual tests that a ratio of the speed of the first auger 64 to the speed of the second auger 68 of the order of about 10 to 1 is satisfactory for use with flour or salt when the ratio of their respective diameters is of the order of 1 to 3. Further, test results show that volumetric metering accuracies of the order of about 1 to 2% are readily obtainable. It should be appreciated that it is not an object of this apparatus to compact or extrude the material, but the augers gently condition the material whereby its characteristics are maintained substantially in their natural state. It is impossible to extrude or force feed the material simply because the larger auger does not have solid sectioning and, hence the material would slip back through the center of the auger if excess axial pressure was applied due to over-feeding for example. This means that the material is not subjected to compacting, segregation, degradation or working, but is discharged at a substantially constant density. It will be appreciated that the second auger 68 eliminates any air pockets plus any unfilled cavities which may exist in the immediate area of the first auger 64 and thereby assures a constant volumetric displacement of the material entering the metering or first auger 64.

Preferably the second auger 68 operates with a relatively close clearance between its outer periphery and the walls of the conditioning chamber 54, the normal total diameterical clearance being of the order of about $\frac{1}{16}$ of an inch. Hence, this auger maintains the material surrounding it in motion so that there are substantially no stagnant areas in the conditioning chamber 54.

As best seen in FIG. 6, a first auger drive shaft 72 extends from one end of the first auger 64, which shaft extends through the end wall 74 of the chamber 54 and is supported by means of bearings 76 carried by frame member 78 which, in turn, is mounted on frame 10, as will be more fully described hereinafter. Frame member 78 is provided with a cover 79 for assembly and disassembly purposes. A coupling 80 couples the shaft 72 to drive shaft 82 which extends from the variable speed transmission 52. It will be appreciated that electric motor 50 drives the transmission 52 which has a pair of drive shafts extending therefrom including drive shafts 48 and 82, the rotational speed of these drive shafts being independently controlled in a known manner. A second auger drive shaft 84 is rigidly attached to the end of auger 68 and is mounted co-axially with respect to the first auger 64 and in spaced relationship thereto. Drive shaft 84 extends through the end wall 74 and is also rotatably supported by means of bearings 76. That is, drive shaft 84 is directly carried by bearings 76 and a pair of bushings 77, interposed between drive shafts 72 and 84, carry shaft 72.

In order to drive the two shafts 72 and 84 at different preselected speeds, shaft 72 is provided with a sprocket 86 and shaft 84 is provided with a sprocket 88. As best seen in FIG. 1, frame member 78 carries a second pair of bearings 90 which support a shaft 92 for rotation. Mounted on shaft 92 are a pair of sprockets 94 and 96, whereby sprockets 86 and 96 carry an endless belt or chain 98, and sprockets 94 and 88 carry a second endless belt or chain 100. The driving torque for the first auger 64 is transmitted through the coupling 80 directly to the shaft 72, and the driving torque for the second auger 68 is transmitted through the coupling 80, the shaft 72, the endless chain 98, the shaft 92, the endless chain 100, and the shaft 84. It will be appreciated that the ratio of speeds of the two augers may readily be adjusted by varying the diameters of the aforementioned sprockets in a known manner.

In order to seal the conditioning chamber 54 and prevent the loss of material therefrom, sealing means designated generally at 102 are provided (FIG. 6). One end of a sleeve 104 is solidly affixed to the end wall 74 and the other end thereof threadably receives a seal plate 106. Packing material 110 is interposed between sleeve 104 and shaft 84, and a packing ring 108 frictionally engages shaft 84. A seal plate 112, a bushing 118 and a packing ring 114 maintain packing 116 in position between the shaft 72 and the shaft 84.

From the foregoing description it will be seen that I contributed a novel feeding apparatus which conditions and accurately meters particulate solid material without densifying, compacting, segregating, degrading or working the material.

Although a particular embodiment of the invention is herein disclosed for purposes of explanation, modifications thereof after study of this specification, will be apparent to those skilled in the art to which the invention pertains. Reference should accordingly be had to the appended claims in determining the scope of the invention.

What is claimed and desired to be secured by Letters Patent is:

1. Apparatus for conditioning and dispensing particulate solid material comprising a bin supported for pivotal movement about a horizontal line located upwardly from the base thereof at a distance of the order of about two-thirds of the height of the bin, said bin having an upper receiving inlet and a lower dispensing outlet, means for arcuately rocking said bin about said axis, a conditioning chamber flexibly connected to said bin in material flow communication with said outlet, outlet means for said chamber, a first auger disposed within said chamber and extending toward said outlet means, a second larger auger mounted coaxially with respect to said first auger, said second auger being disposed concentrically and in overlapping relationship with respect to said first auger substantially throughout the length of said second auger, and means for rotating said augers at a preselected ratio of speeds.

2. Apparatus for conditioning and dispensing particulate solid material comprising a supporting frame, a vertically disposed bin having an upper receiving inlet and a lower dispensing outlet, said bin having a vertical straight front wall and side and back wall portions which slope inwardly toward the dispensing outlet, means mounting said bin on said supporting frame for pivotal movement, said means being disposed at a location upwardly from the base thereof at a distance of the order of about two-thirds of the height of the bin, linkage means mounted on the side of said bin for imparting arcuate reciprocating motion thereto, and motive means for said linkage means.

3. Apparatus according to claim 2 wherein said linkage means comprises a drive shaft having an eccentric projection extending from one end thereof, a connecting rod having one end operatively connected to said eccentric projection and the other end pivotally mounted on the side wall of said bin, and motive means for said drive shaft.

4. Apparatus for conditioning and dispensing particulate solid material comprising a closed conditioning chamber having an upper receiving inlet and a dispensing outlet, a first auger disposed within said chamber and extending toward said outlet and having a helical blade for propelling said material through said outlet in response to rotation of the auger, a second open spiral larger auger mounted co-axially with respect to said first auger for feeding said material into said first auger in response to rotation of the second auger, said second auger being disposed concentrically and in overlapping relationship with respect to said first auger, and means for rotating said augers at a preselected ratio of speeds.

5. Apparatus for dispensing particulate solid material comprising a closed stationary conditioning chamber having an upper receiving inlet and a dispensing outlet, a first positive displacement helical coil type auger disposed within said chamber and extending toward said outlet, said auger being adapted to propel said material toward and through said outlet in response to rotation thereof, a second larger capacity open spiral auger mounted co-axially with respect to said first auger and in radially spaced relationship thereto, said second auger having a helical coil type blade for conditioning and thence feeding said material into said first auger in response to rotation of the second auger, said second auger being disposed concentrically and in overlapping relationship with respect to said first auger substantially throughout the length of said second auger, and means for rotating said augers at a preselected ratio of speeds.

6. Apparatus for dispensing particulate solid material comprising a cylindrical stationary conditioning chamber having an upper receiving inlet and a dispensing outlet, a first auger disposed longitudinally of said chamber and extending at least to a location adjacent said dispensing outlet, said first auger being provided with a helical coil type blade for propelling a predetermined quantity of said material toward and through said dispensing outlet in response to rotation of the auger, a second larger diameter open spiral auger mounted co-axially with respect to said first auger and in radially spaced relationship thereto, said second auger being disposed concentrically and in overlapping relationship with respect to said first auger substantially throughout the length of said second auger, said second auger having one end disposed adjacent said dispensing outlet and being provided with a helical coil type blade for conditioning and thence feeding said material into said first auger in response to rotation of the second auger, means for rotating said augers at a preselected ratio of speeds, and means for adjusting said ratio of speeds during operation of said apparatus.

7. Apparatus for conditioning and dispensing particulate solid material comprising a substantially cylindrical stationary conditioning chamber having an upper receiving inlet and a dispensing outlet, a first auger disposed longitudinally of said chamber and having one end thereof adjacent said dispensing outlet, said auger having a helical coil blade for propelling a predetermined quantity of said material toward and through said dispensing outlet in response to rotation of the auger, a second larger open spiral auger mounted co-axially with respect to said first auger and in spaced relationship thereto, said second auger being disposed concentrically and in overlapping relationship with respect to said first auger substantially throughout the length of said second auger, said second auger having one end disposed adjacent said discharge opening and having a helical coil type blade for conditioning and thence feeding said material into said first auger at a substantially constant volumetric displacement in response to rotation of the second auger, the periphery of said second auger being disposed substantially adjacent the inner surface of said chamber, and means for rotating said augers at a preselected ratio of speeds.

8. Apparatus for conditioning and dispensing particulate solid material comprising a horizontally disposed cylindrical conditioning chamber having an upper receiving inlet and a dispensing outlet at one end thereof, a discharge conduit disposed outwardly of said chamber and connected to said dispensing outlet in material flow communication therewith, a first auger disposed longitudinally of said chamber and having one end thereof extending at least a substantial distance into said conduit and having a helical blade for propelling said material toward and through said discharge conduit in response to rotation of the auger, a second open spiral auger mounted co-axially with respect to said first auger and in radially spaced relationship thereto, said second auger being disposed concentrically and in overlapping relationship with respect to said first auger substantially throughout the length of said second auger, said second auger having one end disposed adjacent said dispensing outlet and having a helical blade for conditioning and thence feeding said material into said first auger at a preselected volumetric displacement in response to rotation of the second auger, the periphery of said second auger being disposed substantially adjacent the inner surface of said chamber, both of said augers being rotated in the same direction, and means for independently controlling the speed of rotation of each of said augers.

9. Apparatus for conditioning and dispensing particulate solid material comprising a substantially cylindrical conditioning chamber having a first end wall and a second end wall, said chamber being provided with an upper receiving inlet and a dispensing outlet disposed in said first end wall, a discharge conduit disposed outwardly of said chamber and connected to said dispensing outlet in material flow communication therewith, a first auger disposed longitudinally of said chamber and having one end thereof extending through said discharge conduit, a first auger drive shaft extending from the other end of said auger and passing through said second end wall, said first auger having a helical blade for propelling said material toward and through said dischrge conduit, a second open spiral mounted co-axially with respect to said first auger and in spaced relationship thereto, said second auger being disposed concentrically and in overlapping relationship with respect to said first auger substantially throughout the length of said second auger, said second auger having one end disposed adjacent said dispensing outlet, a second auger drive shaft mounted coaxially with respect to said first auger drive shaft and in spaced relationship thereto and extending from the other end of said second auger and passing through said second end wall, means for sealing said drive shafts for preventing outward flow of material from said chamber, means for individually driving said drive shafts, and means for independently controlling the speed of rotation of each of said drive shafts.

10. Apparatus for conditioning and dispensing particulate solid material comprising a supporting frame, a vertically disposed bin having an upper receiving inlet and a lower dispensing outlet, said bin having a vertically straight front wall, a back wall disposed at an angle of the order of about 35° with respect to the vertical, a pair of side walls each being disposed at an angle of the order of about 20° with respect to the vertical, means mounting said bin on said supporting frame for pivotal movement, said means being disposed at a location vertically upwardly from the base thereof at a distance of the order of about two-thirds of the height of the bin, linkage means mounted on the side of said bin for imparting arcuate reciprocating motion thereto, and motive means for said linkage means.

References Cited by the Examiner

UNITED STATES PATENTS

| | | | |
|---|---|---|---|
| 445,204 | 1/91 | Sacco | 259—41 |
| 1,783,423 | 12/30 | Harper | 222—161 |
| 2,279,640 | 4/42 | Ringmarck | 198—76 X |
| 2,720,341 | 10/55 | Stirn et al. | 222—227 X |
| 2,957,681 | 10/60 | Moultrie | 259—105 |
| 2,968,424 | 1/61 | Lawson | 222—161 |

FOREIGN PATENTS 577,254   5/46   Great Britain.

LOUIS J. DEMBO, *Primary Examiner.*

UNITED STATES PATENT OFFICE
CERTIFICATE OF CORRECTION

Patent No. 3,186,602 June 1, 1965

Ronald Joseph Ricciardi

It is hereby certified that error appears in the above numbered patent requiring correction and that the said Letters Patent should read as corrected below.

Column 2, line 4, for "thereo" read -- hereto --; column 3, line 17, for "removable" read -- removably --; column 6, line 70, for "dischrge" read -- discharge --; same column 6, line 71, after "spiral" insert -- auger --.

Signed and sealed this 23rd day of November 1965.

(SEAL)
Attest:

ERNEST W. SWIDER
Attesting Officer

EDWARD J. BRENNER
Commissioner of Patents